United States Patent
Ekkelenkamp et al.

(10) Patent No.: US 10,138,133 B2
(45) Date of Patent: Nov. 27, 2018

(54) PROCESS FOR PRODUCING AMMONIUM SULFATE CRYSTALS

(71) Applicant: CAP III B.V., Urmond (NL)

(72) Inventors: Geert Ekkelenkamp, Urmond (NL); Johannes Elisabeth Pierre Debeij, Urmond (NL); Robert Geertman, Urmond (NL); Peter Van Ysacker, Urmond (NL); Johan Thomas Tinge, Urmond (NL)

(73) Assignee: CAP III B.V., Urmond (NL)

( * ) Notice: Subject to any disclaimer, the term of this patent is extended or adjusted under 35 U.S.C. 154(b) by 382 days.

(21) Appl. No.: 14/649,823

(22) PCT Filed: Nov. 29, 2013

(86) PCT No.: PCT/EP2013/075087
§ 371 (c)(1),
(2) Date: Jun. 4, 2015

(87) PCT Pub. No.: WO2014/086676
PCT Pub. Date: Jun. 12, 2014

(65) Prior Publication Data
US 2016/0214868 A1 Jul. 28, 2016

(30) Foreign Application Priority Data
Dec. 6, 2012 (EP) .................................. 12195812

(51) Int. Cl.
*C01C 1/24* (2006.01)
*B01D 9/00* (2006.01)
(Continued)

(52) U.S. Cl.
CPC ............... *C01C 1/24* (2013.01); *B01D 9/004* (2013.01); *B01D 9/0031* (2013.01);
(Continued)

(58) Field of Classification Search
CPC combination set(s) only.
See application file for complete search history.

(56) References Cited

U.S. PATENT DOCUMENTS 3,530,924 A 9/1970 Domning
4,690,807 A 9/1987 Saleem
(Continued)

FOREIGN PATENT DOCUMENTS

CN 86 1 06161 2/1987
DE 43 14 281 1/1995
(Continued)

OTHER PUBLICATIONS

I. Kristjansson, "Commercial Production of Salt from Geothermal Brine at Reykjanes, Iceland", Geothermics, vol. 21, No. 5/6, Jan. 1, 1992, pp. 765-771.

*Primary Examiner* — Dirk R Bass
(74) *Attorney, Agent, or Firm* — Nixon & Vanderhye P.C.

(57) ABSTRACT

The present invention provides a continuous process for producing ammonium sulfate crystals, wherein said process comprises: i) feeding to a series of crystallization sections, which crystallization sections are heat integrated in series, a solution of ammonium sulfate; ii) crystallizing ammonium sulfate crystals from said solution of ammonium sulfate; iii) purging a fraction of the solution of ammonium sulfate from each of said crystallization sections; and iv) discharging ammonium sulfate crystals from each crystallization section, characterized in that: a fraction of said solution of ammonium sulfate is purged from at least one crystallization section to at least one other crystallization section; and an apparatus suitable for producing ammonium sulfate crystals.

12 Claims, 2 Drawing Sheets

Figure 1:
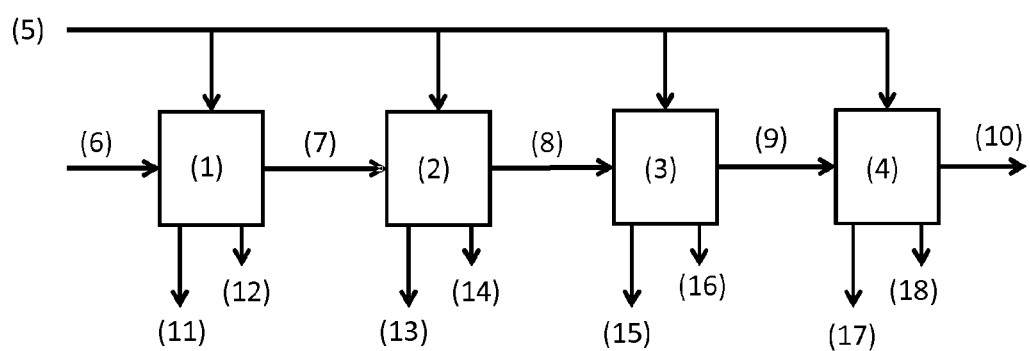

(51) Int. Cl.
*C01C 1/248* (2006.01)
*C05C 3/00* (2006.01)

(52) U.S. Cl.
CPC ......... *B01D 9/0036* (2013.01); *B01D 9/0059* (2013.01); *B01D 9/0063* (2013.01); *C01C 1/248* (2013.01); *C05C 3/00* (2013.01); *C05C 3/005* (2013.01); *B01D 2009/0086* (2013.01)

(56) References Cited

U.S. PATENT DOCUMENTS

2003/0180202 A1\* 9/2003 Ellen .................. B01D 9/0022
  422/245.1
2011/0038781 A1   2/2011 Hofmann

FOREIGN PATENT DOCUMENTS

| EP | 1 123 900 | 8/2001 |
| GB | 748 572 | 5/1956 |
| WO | WO 2009/077346 | 6/2009 |

\* cited by examiner

PROCESS FOR PRODUCING AMMONIUM SULFATE CRYSTALS

This application is the U.S. national phase of International Application No. PCT/EP2013/075087 filed 29 Nov. 2013, which designated the U.S. and claims priority to EP 12195812.8 filed 6 Dec. 2012, the entire contents of each of which are hereby incorporated by reference.

The invention relates to a process for preparing ammonium sulfate crystals.

Ammonium sulfate is useful as a fertilizer, e.g., for use in agriculture, horticulture or forestry. It is often applied as a crystalline material. Ammonium sulfate crystals for this use are classified according to crystal size. In general large crystals are more easy to handle. Further, crystals of a certain size distribution, of relatively large average crystal size, can be used in commercially valuable fertilizer blends and are therefore economically more valuable than small crystals. However, it is desirable to produce ammonium sulfate of different grades, for different applications.

Ammonium sulfate crystals may be obtained by subjecting an ammonium sulfate solution to crystallization and subjecting the resulting slurry of ammonium sulfate crystals to a size classification step. The large crystals are generally desired as the product for a further use, in particular for use as a fertilizer.

Crystallization by evaporation typically involves heat input to evaporate solvent and concentrate the remaining solution. In order to reduce steam consumption needed for evaporative crystallization in the production of sodium chloride crystals from aqueous sodium chloride solutions, for example, a series of crystallizers are in general integrated with respect to heat input (see e.g. I. Kristjansson, Geothermics, 21 (1992); pp 765-771). This is commonly done by passing steam at a high temperature into the first crystallizer in a series. The resulting lower temperature steam is used to heat the next crystallizer, and so on. This means that a series of crystallizers operates at descending temperatures. The size and conditions of the crystallizers are optimized for this heating arrangement. GB748572 describes a process for the multi-stage evaporation of salt depositing liquids, in order to avoid fouling. However, no specific product is described other than salt solution or cellulose waste liquor.

WO2009/077346 describes a process for separating fines of ammonium sulfate from a suspension of crystals of desired size by use of a wash thickener. Solution from which the crystals are separated is used in the wash thickener.

During conventional operation of an evaporative crystallizer, impurities become concentrated in the solution. Accordingly, a purge is employed, whereby solution is, continuously or periodically, discharged from the crystallizer. In a conventional series of crystallization sections, each crystallization section operates at the same concentration of impurity. Since the impurity of the crystals produced is proportional to the purity of the solution from which they are grown, the product crystals from each crystallization section in the series contain the same level of impurity.

DE4314281C1 describes a multi-stage evaporation of aqueous ammonium sulfate solutions from caprolactam production involving recirculation of the mother liquor.

However, it is desirable to produce higher purity grades of crystalline product for different applications. Higher purity product is economically more valuable. The present inventors have found a method of increasing the purity of the majority of crystals produced by a crystallization section. Specifically, they have found that by introducing a system where ammonium sulfate solution is purged from one crystallization section in the series to another crystallization section in the series, the mean concentration of impurities in the series of crystallization sections can be reduced. Further, the system of purging can be arranged such that the purity of product crystals from all but one of the crystallization sections is far higher than that of the prior art. An additional advantage of the invention is that the crystallization yield of ammonium sulfate crystals with a high purity is higher than that of the prior art. And further, the advantages mentioned before can be combined.

Accordingly, the present invention provides a continuous process for producing ammonium sulfate crystals, wherein said process comprises:
i) feeding to a series of crystallization sections, which crystallization sections are heat integrated in series, a solution of ammonium sulfate;
ii) crystallizing ammonium sulfate crystals from said solution of ammonium sulfate;
iii) purging a fraction of the solution of ammonium sulfate from each of said crystallization sections;
iv) discharging ammonium sulfate crystals from each crystallization section, characterized in that:
a fraction of said solution of ammonium sulfate is purged from at least one crystallization section to at least one other crystallization section.

The present invention further provides apparatus suitable for producing ammonium sulfate crystals, comprising:
i) a series of crystallization sections of substantially equal production capacity of ammonium sulfate crystals, which are configured to be heat integrated with respect to steam;
ii) a steam supply system integrating the crystallization sections in series;
iii) a feed of ammonium sulfate solution; and
iv) a system of removal of ammonium sulfate crystals;
characterized in that,
at least one crystallization section is connected by a purge line to another crystallization section in the series.

As used herein, ammonium sulfate crystals include impurities that may be present, as known by the skilled person.

A crystallization section comprises all equipment necessary to accept a solution of ammonium sulfate, and discharge ammonium sulfate crystals. In its simplest form this means a crystallizer and a separation unit.

A series of crystallization sections, which crystallization sections are heat integrated in series means that heat is applied to the crystallization section at one end of the series; heat is then transferred, directly or indirectly, to the next crystallization section in the series; and so on until the last crystallization section in the series. In this way, a single external heat source is used to heat all crystallization units in the series, but is applied directly only to the first.

By purging a fraction of the solution of ammonium sulfate is meant that a fraction of the solution of ammonium sulfate is discharged from the crystallization section. The purpose of the purge is to reduce the impurity content in the solution of ammonium sulfate, thereby also reducing the impurity content of the crystallized ammonium sulfate.

A solution of ammonium sulfate consists just of solvent, impurities and (pure) ammonium sulfate. Ammonium sulfate crystals consist just of impurities and (pure) ammonium sulfate.

The separation factor is the ratio between the amount of impurities in the solution of ammonium sulfate (mother liquor) and the amount of impurities incorporated in the ammonium sulfate crystals formed from said solution. Both are measured on a mass basis. Separation factor, S, is defined as:

$$S=[(m_{imp}^{solution})/m_{imp}^{solution}+m_{amm}^{solution})]/[(m_{imp}^{crystals})/(m_{imp}^{crystals}+m_{amm}^{crystals})].$$

where
- $m_{imp}^{solution}$ = mass impurities in 1 kg solution of ammonium sulfate
- $m_{amm}^{solution}$ = mass pure ammonium sulfate in 1 kg solution of ammonium sulfate
- $m_{imp}^{crystals}$ = mass impurities in 1 kg ammonium sulfate crystals
- $m_{amm}^{crystals}$ = mass pure ammonium sulfate in 1 kg ammonium sulfate crystals For example, for a system with a separation factor of 1000, the impurity content of the crystals is 0.1% that of the impurity content of the solution from which the crystals are formed. During evaporative crystallization, the impurity content of the solution therefore increases. The purge is used to discharge solution with a high impurity content. Purging may be continuous or intermittent.

The apparatus of the present invention comprises crystallization sections which are configured to be heat integrated with respect to steam. By this it is meant that steam is the heat source, and that the series of crystallization sections comprises the necessary pipework that heat can be transferred by input of steam to the first crystallization section in the series, and the heat transferred throughout the series, as described above. The temperature of successive crystallization sections in the series is therefore successively lower. Therefore, there is a direction of descending temperature of steam supply, from the first crystallization section to the last crystallization section in the series.

Purge of ammonium sulfate solution according to the present invention is typically to the next crystallization section in the series. This is with the exception that the purge from the final crystallization section is discharged from the series.

As used herein, the term substantially equal production capacity of ammonium sulfate crystals means that production capacity typically deviates by less than 10% between crystallization sections. Preferably, it is less than 5%; more preferably less than 2%. Production capacity is typically measured as mass of product produced in unit time. For example, in kg per hour, or kilotons per annum (kta).

Concentration factor is the ratio between the liquid streams entering the crystallization section and the liquid streams leaving the crystallization section. Concentration factor is defined as mass of solution of ammonium sulfate entering the crystallization unit/mass of solution of ammonium sulfate exiting the crystallization section. For example, in case the feed of fresh solution of ammonium sulfate entering crystallization section A equals x kg/s; the feed of solution of ammonium sulfate purged from another crystallization section and entering crystallization section A equals to y kg/s, and the purge of solution of ammonium sulfate exiting crystallization section A equals to z kg/s, then concentration factor becomes (x+y)/z.

Typically, the crystallization sections are heat integrated by means of steam. Steam is readily available as a heat source on chemical production facilities.

Typically, a fraction of said solution of ammonium sulfate is purged from each crystallization section in the series to the next crystallization unit in the series, as defined by descending temperature of steam supply, with the exception that the purge from the final crystallization section in the series is discharged from the series. In such a way impurity build-up in each of the crystallization sections is avoided, except for in the final crystallization section in the series. Typically, in each of the crystallization sections the concentration of impurities will be lower than the non-purge coupled prior art system, except for the final crystallization section, where impurities will be concentrated.

A system wherein ammonium sulfate solution is purged to the next crystallization section in the series means that impurities are concentrated in the last crystallization section in the series. Accordingly, the produced crystals can be further processed as a particularly pure product and a less pure product. Or the products can be combined to produce a product which is on average more pure than a system without purge coupling.

For any given series of crystallization sections, it is preferred that the crystallization sections are each of the same size and type, because of lower investment costs. Typically, each crystallization section has substantially equal production capacity of ammonium sulfate crystals. The production capacity is important, because the steam used from one effect is used for the next effect, as described in Kristjansson in Geothermics 21 (1992) 765-771.

A further advantage of having substantially equal production capacity is that equipment can be standardized. The crystallizer and the separation units, for example centrifuges and filters, are preferably respectively each of the same type.

In principle, any number of crystallization sections may be used in the series. However, typically, the series comprises from two to four crystallization sections. Typically, each crystallization section comprises an Oslo-type crystallizer. Oslo-type crystallizers are particularly suitable for the present invention because they are capable of producing crystals of larger mean median diameter. That is in general desirable for ammonium sulfate crystals.

The operating temperature of the first crystallization section is determined by the temperature of the available steam. The temperature of the last crystallization section is in general determined by the temperature of the available cooling medium. The total number of crystallization sections is determined by the temperature difference between the first and last section, as described by Kristjansson in Geothermics 21 (1992) 765-771.

Accordingly, typically, the temperature of steam entering the first crystallization section in the series is from 80° C. to 160° C. Preferably, it is from 100° C. to 140° C., for example 120° C.

Typically, the temperature of steam exiting the last crystallization section in the series is from 40° C. to 60° C. Preferably, it is from 45° C. to 55° C., for example 50° C.

Typically, the production capacity of ammonium sulfate crystals of each crystallization section is on the scale of thousands of tons per year (kilotons per annum; kta). Preferably, it is from 10 kta to 200 kta. More preferably, the production capacity of each crystallization section is from 30 kta to 150 kta.

As mentioned above, crystals of a larger size are preferred, because they generally have a larger economic value. Typically, the mean median diameter of crystals produced is greater than 0.8 mm. Preferably, the mean median diameter of the ammonium sulfate crystals discharged is from 1.0 mm to 4.0 mm.

The solution of ammonium sulfate is typically an aqueous solution. It may also contain impurities. Typical impurities arise from the method by which the solution of ammonium sulfate is produced. Preferably, the solution of ammonium sulfate is produced from a process for producing ε-caprolactam or acrylonitrile. Accordingly, the impurities present are typically those commonly produced in such reactions and/or already available in its raw materials.

The temperature drop of steam applied to each crystallization section is determined by the boiling point of the solution of ammonium sulfate in each crystallization section. A further, unexpected effect of the present invention is that the lower impurity concentration causes the boiling point of the solution of ammonium sulfate to drop. Accordingly, less heat needs to be transferred to the crystallization section to evaporate a given amount of solvent. In other words, less energy, for example steam, is required to produce a certain volume of crystals. Or, steam of a lower input temperature may be utilized.

In the apparatus of the present invention, typically, each crystallization section is connected by a purge line to the next crystallization section in the series, as defined by descending temperature of steam supply, with the exception that the purge from the final crystallization section is discharged from the series.

Typically, each crystallization section comprises an evaporative crystallizer and solid-liquid separation equipment. The crystallizer may be of any suitable type. However, preferably, each crystallizer is an Oslo-type crystallizer. Solid-liquid separation equipment means any equipment suitable to separate ammonium sulfate crystals from a solution comprising ammonium sulfate. It may include a continuous filter, a centrifuge, a decanter, an elutriation column, a salt leg or a combination thereof. For example, it may comprise a salt leg in combination with an elutriation column and a centrifuge. Typically, after leaving the crystallization section the resulting ammonium sulfate crystals are discharged to a drying section. Crystals from each crystallization section may be combined either before or after drying.

The apparatus of the present invention is typically an ammonium sulfate crystallization plant. Typically, such a plant is integrated with another chemical plant. For example a plant of the production of caprolactam or cyclohexanone oxime. Capacity of the ammonium sulfate crystallization plant is typically selected based on the volume of ammonium sulfate solution discharged from another chemical plant. Further, crystallization section size is selected based on optimum conditions. Typically, the production capacity of ammonium sulfate crystals of each crystallization section is from 30 kta to 150 kta.

The present invention will be more fully explained with reference to the following drawings.

FIG. 1 describes an embodiment of the prior art, wherein four crystallization sections are arranged in parallel in view of the feed of solution of ammonium sulfate.

Figure 2:
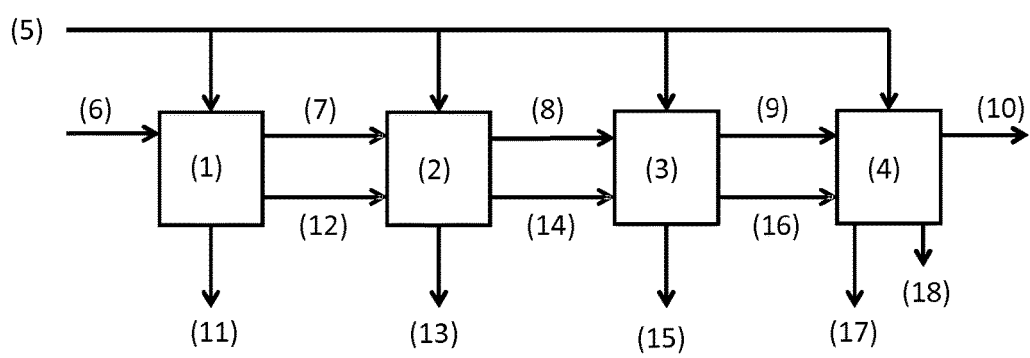

FIG. 2 describes an embodiment of the present invention, wherein the purge lines are adapted to discharge a fraction of solution of ammonium sulfate from the crystallization sections.

FIG. 1 describes an embodiment of the prior art. Four crystallization sections, (1), (2), (3), (4), each comprising a crystallizer of equal size are arranged in parallel with respect to the feed of ammonium sulfate solution. A solution of ammonium sulfate passes through feed line (5) into each crystallization section, where crystallization occurs to form a slurry of ammonium sulfate crystals in an ammonium sulfate solution. Steam is fed to the crystallization section (1), via line (6), where it is used to evaporate solvent from the ammonium sulfate solution, thereby aiding crystallization. The steam does not directly contact the ammonium sulfate solution, but transfers heat indirectly thereto via a heat exchange unit. A solvent-comprising vapor stream is formed in crystallization section (1), and is discharged through line (7) to crystallization section (2), where it is used to evaporate solvent, analogous to the process in crystallization section (1). The solvent-comprising vapor stream formed in crystallization section (2) is discharged through line (8) to crystallization section (3) where it is used to evaporate solvent analogous to the process in crystallization section (1). The solvent-comprising vapor stream formed in crystallization section (3) is discharged through line (9) to crystallization section (4) where it is used to evaporate solvent analogous to the process in crystallization section (1). The solvent-comprising vapor stream formed in crystallization section (4) is discharged via line (10). Ammonium sulfate crystals are discharged from crystallization section (1) though line (11) for further processing. A fraction of ammonium sulfate solution comprising impurities is purged through line (12). Ammonium sulfate crystals are discharged from crystallization section (2) though line (13) for further processing. A fraction of solution of ammonium sulfate comprising impurities is purged through line (14). Ammonium sulfate crystals are discharged from crystallization section (3) though line (15) for further processing. A fraction of solution of ammonium sulfate comprising impurities is purged through line (16). Ammonium sulfate crystals are discharged from crystallization section (4) though line (17) for further processing. A fraction of solution of ammonium sulfate comprising impurities is purged through line (18). Optionally, the ammonium sulfate crystals from lines (11), (13), (15) and (17) are combined, either before or after any further processing step. The solutions of ammonium sulfate purged through lines (12), (14), (16) and (18) are treated as waste, and undergo further processing. Optionally, these solutions of ammonium sulfate are combined.

FIG. 2 describes an embodiment of the present invention. The system is essentially the same as that of FIG. 1. Specifically, crystallization section (1); the feed of solution of ammonium sulfate (5); the steam system (6), (7), (8), (9), (10); the four lines through which ammonium sulfate crystals are discharged from the crystallization sections (11), (13), (15), (17); and purge line (18) are identical to those of FIG. 1. The purge lines (12), (14) and (16), are adapted to discharge a fraction of the solution of ammonium sulfate from crystallization sections (1), (2) and (3), respectively to crystallization sections (2), (3) and (4), respectively. Crystallization sections (2), (3) and (4) are adapted to receive a purge of solution of ammonium sulfate. Accordingly, a fraction of the solution of ammonium sulfate is purged from crystallization section (1) via line (12) into crystallization section (2); a fraction of the solution of ammonium sulfate is purged from crystallization section (2) via line (14) into crystallization section (3); and a fraction of the solution of ammonium sulfate is purged from crystallization section (3) via line (16) into crystallization section (4).

The invention is illustrated by but not intended to be limited to the following Examples.

The Examples are based on a simple calculation using approximate parameters. Input parameters are representative of operating ammonium sulfate crystallization plant data. These parameters are the total production capacity of the system, the target yield of the crystallization, and the separation factor (a feature of the crystal system). The separation factor and the total production rate of ammonium sulfate crystals are each respectively equal for each of the following examples, as discussed in detail below. In the examples all fresh feeds and all purge streams of solutions of ammonium sulfate, including any impurities, do not contain solids.

COMPARATIVE EXAMPLE

In this comparative example a parallel ammonium sulfate crystallization system substantially as described in FIG. 1 is used. An aqueous ammonium sulfate lye containing on dry base 0.05 wt. % of impurities (=(weight of impurities in lye)/((weight of impurities in lye)+(weight of pure ammonium sulfate in lye)) is crystallized by evaporative crystallization in a set of four crystallization sections of equal capacity, arranged in series. The total production rate of ammonium sulfate crystals is 100 kta (on dry base: so, impurities and pure ammonium sulfate). Accordingly, 25 kta of ammonium sulfate crystals are produced per crystallization section. The total purge comprising streams (12), (14), (16) and (18) is 2 kta (on dry basis: so, impurities and pure ammonium sulfate). This implies that the total fresh feed comprising stream (5) is 102 kta (on dry base: so, impurities and pure ammonium sulfate)).

Thus, the total yield of ammonium sulfate crystals is about 98.0 wt. % (100 kta ammonium sulfate crystals divided by 102 kta fresh feed).

Therefore, the feed per crystallization section is on dry base 25.5 kta (pure ammonium sulfate and impurities) and the purge per crystallization section is on dry base 0.5 kta (pure ammonium sulfate and impurities). The concentration factor of the impurities in each crystallization section is 51 (25.5 kta fresh feed divided by 0.5 kta purge), and the concentration of impurities in the purge stream of each crystallization section is on dry base about 2.4 wt. % and hence the ammonium sulfate crystals in the streams (11), (13), (15) and (17) contain about 0.0024 wt. % impurities.

Example 1

In Example 1 a coupled slurry system substantially as described in FIG. 2 is used. The total fresh feed comprising stream (5) is 102 kta (on dry base: so, impurities and pure ammonium sulfate), the total production rate of ammonium sulfate crystals in the streams (11), (13), (15) and (17) is 100 kta (on dry base: so, impurities and pure ammonium sulfate) and the total purge, stream (18) is 2 kta (on dry base: so, impurities and pure ammonium sulfate). The system is operated substantially as described for the Comparative Example, except that the amount of purge from one crystallization section to the next is controlled, as are the fresh feed rates to each crystallization section (described in Table 1, below). Here, in contrast to the Comparative Example, the feed rates for the different crystallization sections are not equal.

TABLE 1

(all figures are on dry base)

| | Crystallization section no. | | | |
|---|---|---|---|---|
| | 1 | 2 | 3 | 4 |
| Fresh feed (kta) | 32 | 32 | 32 | 6 |
| Impurity in fresh feed (wt. %) | 0.05 | 0.05 | 0.05 | 0.05 |
| Purge from previous crystallization section (kta) | 0 | 7 | 14 | 21 |
| Impurity in purge from previous crystallization section (wt. %) | 0 | 0.23 | 0.23 | 0.23 |
| Total feed (kta), | 32 | 39 | 46 | 27 |
| Impurity in total feed (wt. %) | 0.05 | 0.082 | 0.104 | 0.188 |
| Purge (kta) | 7 | 14 | 21 | 2 |
| Concentration factor | 4.6 | 2.8 | 2.2 | 13.5 |
| Impurity in purge crystallization section (wt. %) | 0.23 | 0.23 | 0.23 | 2.5 |
| Impurity in ammonium sulfate crystals (wt. %) | 0.00023 | 0.00023 | 0.00023 | 0.0025 |

Total feed is defined as sum of fresh feed and purge from previous crystallization section.

The third crystallization section is taken here as an example, the results for the other crystallization sections can be obtained in a similar manner. In the third crystallization section fresh feed comprising on dry base 32 kta (99.95 wt. % ammonium sulfate and 0.05 wt. % impurities) and a purge from the second crystallization section comprising on dry base 14 kta (about 99.77 wt. % ammonium sulfate and about 0.23 wt. % impurities) enter. The total amount of impurity charged to the third crystallizer is about ((32 kta times 0.05 wt. %+14 kta times 0.23 wt. %) 0.048 kta. The mean impurity concentration of the total feed is on dry base ((32 kta times 0.05 wt. %+14 kta times 0.23 wt. %)/(32 kta+14 kta)) 0.104 wt. %. The purge from the third crystallization section comprises on dry base 21 kta (ammonium sulfate and impurities). The concentration factor is (total feed being sum of fresh feed and purge from second crystallization section divided by purge of third crystallization section; so, 46 kta divided by 21 kta) about 2.2. The total production rate of the third crystallization section is 25 kta ammonium sulfate crystals (on dry base: so, impurities and pure ammonium sulfate).

The concentrations of impurities in the purge from the third crystallization and in the produced ammonium sulfate crystals are simply obtained from the following mass balance equation:

$$imp^{3IN} = purge^{3out} * imp^{3purge} + crystal^{3out} * imp^{3crystal}$$

where
  $imp^{3IN}$=total amount of impurity charged to the third crystallizer (kta)
  $purge^{3out}$=purge on dry base of third crystallizer (kta)
  $imp^{3purge}$=impurity concentration in purge of third crystallizer (wt. %)
  $crystal^{3out}$=production of ammonium sulfate crystals in third crystallizer (kta)
  $imp^{3crystal}$=impurity concentration in ammonium sulfate crystals produced in third crystallizer (wt. %), which is $((imp^{3purge})/$separation factor) is $(imp^{3purge})/1000$.

After substitution it follows that the impurity concentration in purge of third crystallization section is on dry weight base about 0.23 wt. %)

The separation factor is 1000, so the concentration of impurities in the ammonium sulfate crystals produced in the third crystallization section is (0.23 wt. %/1000) is 0.00023 wt. %.

As can be seen from the above results, the wt. % impurities in the ammonium sulfate crystals produced in crystallization sections (1), (2) and (3) of Example 1 are substantially lower than for the ammonium sulfate crystals produced in crystallization sections (1), (2) and (3) of the Comparative Example (0.00023 wt. % vs. 0.0024 wt. %). The wt. % impurity of ammonium sulfate crystals produced in crystallization section (4) of Example 1 is only a few percent higher than the wt. % impurity of ammonium sulfate crystals produced in crystallization section (4) of the Comparative Example (0.0025 wt. % vs. 0.0024 wt. %).

Further, if the ammonium sulfate crystals produced in crystallization sections (1), (2), (3) and (4) in Example 1 are mixed, the mean wt. % impurities of the combined ammonium sulfate crystals is then about 0.0008 wt. % which is substantially lower than the mean wt. % impurities of the combined ammonium sulfate crystals in the Comparative Example (being 0.0024 wt. %).

Comparison of the results of Example 1 with those of the Comparative Example clearly shows that the purge system of the present invention reduces mean impurity content in the crystalline ammonium sulfate produced, while the total yield of ammonium sulfate crystals remains unchanged.

Example 2

In Example 2 a coupled slurry system substantially as described in FIG. 2 was used. The total production rate of ammonium sulfate crystals in the streams (11), (13), (15) and (17) is 100 kta (on dry base: so, impurities and pure ammonium sulfate). The mean impurity content of ammonium sulfate crystals produced in crystallization sections (1), (2), (3) and (4) is about 0.0024 wt. %, which is equal to the mean impurity content of ammonium sulfate crystals produced in crystallization sections (1), (2), (3) and (4) in the Comparative Example. The system is operated substantially as described for the Comparative Example, except that the amount of purge from one crystallization section to the next was controlled, as were the fresh feed rates to each crystallization section (described in Table 2, below). Here, in contrast to the Comparative Example, the feed rates for the different crystallization sections are not equal.

The obtained results are given in Table 2.

TABLE 2

| | Crystallization section no. | | | |
| --- | --- | --- | --- | --- |
| | 1 | 2 | 3 | 4 |
| Fresh feed (kta) | 33.5 | 33.5 | 33.5 | 0.02 |
| Impurity in fresh feed (wt. %) | 0.05 | 0.05 | 0.05 | 0.05 |
| Purge from previous crystallization section (kta) | 0 | 8.5 | 17 | 25.5 |
| Impurity in purge from previous crystallization section (wt. %) | 0 | 0.20 | 0.20 | 0.20 |
| Total feed (kta), | 33.5 | 42 | 50.5 | 25.52 |
| Impurity in total feed (wt. %) | 0.05 | 0.080 | 0.099 | 0.196 |
| Purge (kta) | 8.5 | 17 | 25.5 | 0.52 |
| Concentration factor | 3.9 | 2.5 | 2.0 | 49 |
| Impurity in purge crystallization section (wt. %) | 0.20 | 0.20 | 0.20 | 9.1 |
| Impurity in ammonium sulfate crystals (wt. %) | 0.00020 | 0.00020 | 0.00020 | 0.0091 |

Total feed is defined as sum of fresh feed and purge from previous crystallization section.

As can be seen from the above results, the wt. % impurities in the ammonium sulfate crystals produced in crystallization sections (1), (2) and (3) of Example 2 are substantially lower than for the ammonium sulfate crystals produced in crystallization sections (1), (2) and (3) of the Comparative Example (0.00020 wt. % vs. 0.0024 wt. %). The wt. % impurity of ammonium sulfate crystals produced in crystallization section (4) of the Example 2 is higher than the wt. % impurity of ammonium sulfate crystals produced in crystallization section (4) of the Comparative Example (0.0091 wt. % vs. 0.0024 wt. %). The mean wt. % impurities of the combined ammonium sulfate crystals produced in crystallization sections (1), (2), (3) and (4) in Example 2 is about 0.0024 wt. %.

In Example 2, the purge of crystallization section (4) is just 0.52 kta (on dry base: so, impurities and pure ammonium sulfate). This means that the total fresh feed on dry base to all crystallization sections is (sum of total amount of ammonium sulfate crystals produced on dry base and purge of crystallization section (4) on dry base) just 100.52 kta. So, the total yield of ammonium sulfate crystals is as high as (100 kta divided by 100.52 kta) 99.5 wt. %.

Comparison of the results of Example 2 with those of the Comparative Example clearly shows that the purge system of the present invention increases the total yield of ammonium sulfate crystals, while the mean impurity content in the produced ammonium sulfate crystals remains unchanged.

The invention claimed is:

1. A continuous process for producing ammonium sulfate crystals, wherein the process comprises:
   i) feeding a solution of ammonium sulfate comprising impurities to a heat-integrated series of crystallization sections;
   ii) crystallizing ammonium sulfate crystals from the solution of ammonium sulfate;
   iii) purging a fraction of the solution of ammonium sulfate from each of the crystallization sections; and
   iv) discharging ammonium sulfate crystals from each of the crystallization sections, wherein
   the ammonium sulfate crystals discharged from each of the crystallization sections are not charged to another crystallization section, and wherein
   the process further comprises:
   heat-integrating the crystallization sections by steam, and purging a fraction of the solution of ammonium sulfate from each crystallization section in the series to the next crystallization unit in the series, as defined by descending temperature of steam supply, with the exception that the fraction of the solution of ammonium sulfate purged from the final crystallization section in the series is discharged from the series.

2. The process according to claim 1, wherein each crystallization section has substantially equal production capacity of ammonium sulfate crystals.

3. The process according to claim 1, wherein the series comprises from two to four, crystallization sections.

4. The process according to claim 1, wherein each crystallization section comprises an Oslo-type crystallizer.

5. The process according to claim 1, wherein the temperature of steam entering the first crystallization section in the series is from 80° C. to 160° C.

6. The process according to claim 1, wherein the temperature of steam exiting the last crystallization section in the series is from 40° C. to 60° C.

7. The process according to claim 1, wherein each of the crystallization sections has a production capacity which is from 30 kta to 150 kta.

8. The process according to claim 1, wherein the ammonium sulfate crystals discharged from the crystallization sections have a mean median diameter which is from 1.0 mm to 4.0 mm.

9. The process according to claim 1, wherein the solution of ammonium sulfate is produced from a process for producing ε-caprolactam or acrylonitrile.

10. An apparatus suitable for producing ammonium sulfate crystals according to the process of claim 1, comprising:
   i) a series of crystallization sections of substantially equal production capacity of ammonium sulfate crystals which are configured to be heat integrated with respect to steam;
   ii) a steam supply system integrating the crystallization sections in series;
   iii) a feed of ammonium sulfate solution; and
   iv) a system of removal of ammonium sulfate crystals; wherein
   the ammonium sulfate crystals discharged from each of the crystallization sections are not charged to another crystallization section, and wherein
   each crystallization section is connected by a purge line to the next crystallization section in the series, as defined by descending temperature of steam supply, with the exception that a purge from the final crystallization section is discharged from the series.

11. The apparatus according to claim 10, wherein each crystallization section comprises an evaporative crystallizer and solid-liquid separation equipment.

12. The apparatus according to claim 10, wherein each of the crystallization sections is sized so as to have a production capacity from 30 kta to 150 kta.

\* \* \* \* \*